Dec. 26, 1967  J. H. SOLEAU  3,359,840
EXTENSION TOOL HOLDER
Filed Feb. 1, 1965

INVENTOR.
Joseph Soleau
BY
Donald P. Gillette
ATTORNEY

United States Patent Office 3,359,840
Patented Dec. 26, 1967

3,359,840
EXTENSION TOOL HOLDER
Joseph H. Soleau, Caldwell, N.J., assignor to Philips Electronics and Pharmaceutical Industries Corp., New York, N.Y., a corporation of Delaware
Filed Feb. 1, 1965, Ser. No. 429,364
1 Claim. (Cl. 82—36)

This invention relates to an extension tool holder and particularly to a tool holder for use in a lathe of the type having a turret and commonly referred to as a "chucking" machine.

Chucking machines are especially useful where several operations, such as boring, turning, facing, and the like, are to be carried out semi-automatically in series on a rotating workpiece. Chucking machines of different manufacture have tool holders of different sizes which are not interchangeable. The distance between the axis of the workpiece and the base of the tool holders differs not only from one brand to another, but in any machine the tools must be grounded and set, frequently with the aid of shims, to the proper height with respect to the workpiece. Shimming increases the set-up time before the machining can be started, and the need to use tools only on the particular brand of machines for which they have been formed restricts the versatility of the machines and the tool holders. Still another fault to be found in tool holders of the type made heretofore is that their construction has unnecessarily limited the length of piece that can be turned on the chucker.

One of the objects of the present invention is to provide a versatile, rugged extension tool holder capable of receiving tools of various sizes and capable in itself of setting the location of the cutting of the tools with respect to the centerline of the workpiece being machined.

A further object is to provide an extension tool holder in which a limited number of interchangeable parts may be used to provide different amounts of extensions.

A still further object is to provide an extension tool holder easily adapted to receiving boring bits of varying sizes.

Further objects will become apparent from the following specifications.

The extension tool holder of the present invention is made in several parts, one of which is a mounting block to be attached to the usual T-slot in a turret of a chucking machine. A side piece is attached to the mounting block, and one edge of the side piece is shaped to form one side of a dovetail holder. A juxtaposed edge of the block is the other side of the dovetail holder into which an extension arm having a matching dovetail fits. A pin extends from the forward surface of the block approximately in the centerline of the dovetail and the center portion of the dovetail on the arm is removed to form a slot that fits over the pin. A set screw enters the top of the extension arm directly over this slot, to be set to the proper level to engage the pin in the mounting block to set the height of the extension arm relative to the upper surface of the turret. The side piece is then brought up tightly against the dovetail of the extension arm. The extension arm preferably extends downward a short distance to accommodate tools of various sizes. The outer end of the extension arm is divided to form a rigid pair of tool-clamping jaws between which various tools may be clamped.

The invention will be further described in conjunction with the drawings in which.

Figure 1:
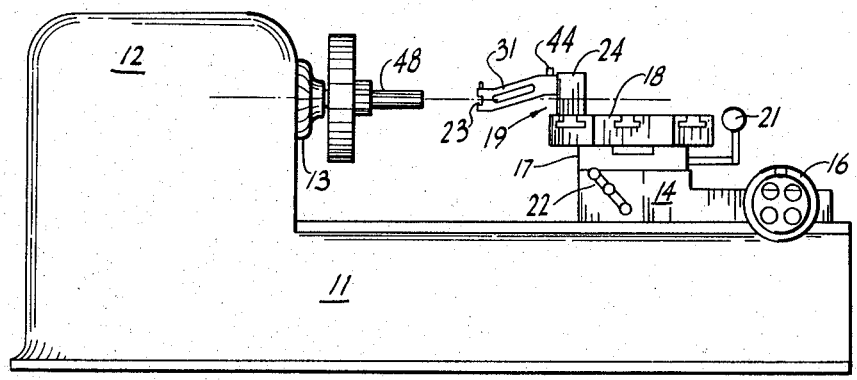
FIG. 1 is a simplified view of a chucking machine showing a tool holder of the type of the present invention mounted on the turret of the machine.

The chucking machine of FIG. 1 comprises a base 11 with a headstock 12 at one end. The headstock has a spindle 13 to accommodate chucks or face plates of various types. A drive motor for the spindle 13 may be accommodated within or beneath the headstock 12.

On the bed 11 is a carriage 14 which may be moved longitudinally along the bed by a hand wheel 16 or by another motor (not shown). A cross-slide 17 is mounted on the carriage 14 to support and guide a turret 18 having provisions for receiving several different tool holders, including a tool holder 19 constructed according to the present invention. A handle 21 controls the position of the turret 18 by locking the turret rigidly in place when the handle is in the position shown and by releasing the turret for rotation to bring a new tool into operating position when the handle is moved to an unlocked position. The cross-slide 17 may be moved transversely across the carriage 14 either by a hand wheel 22 or by a motor (not shown).

Figures 2, 6, 7:
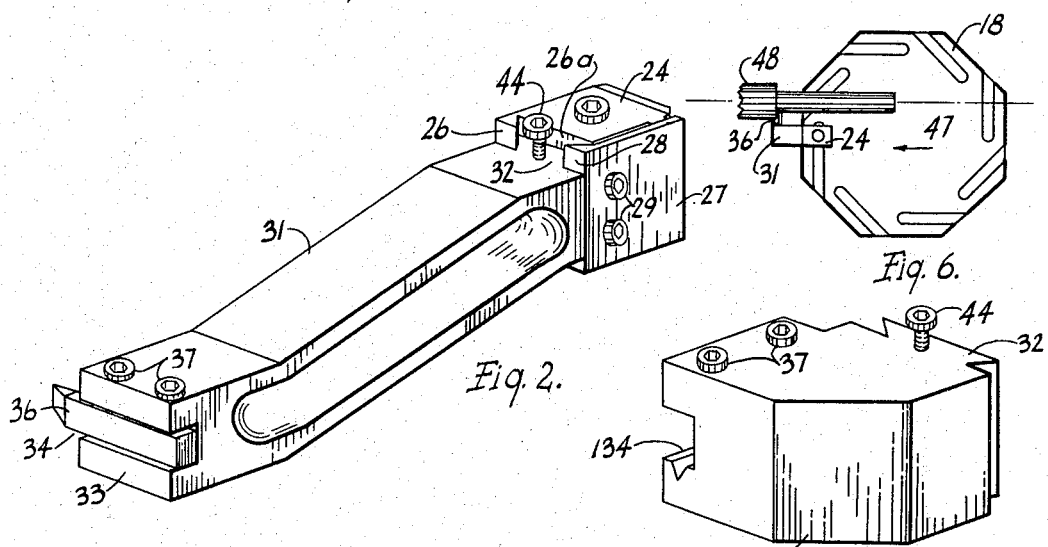
FIG. 2 is a perspective view of one embodiment of the tool holder of the present invention.
FIG. 6 is a top view of the turret in FIG. 1 with an extension tool holder mounted thereon in position to machine an elongated bar.
FIG. 7 shows a modified form of tool holder for holding a round bit.

The tool holder 19 is shown in more detail in FIG. 2 and includes a mounting block 24 by which it is attached to the turret 18. The front face 26 of the mounting block has a recessed surface 26a that forms part of a female dovetail joint. The dovetail is completed by a side piece 27 that has a lip 28 extending toward the surface 26 when the side piece is attached to the mounting block by a pair of screws 29.

The tool holder includes an extension arm 31 having a male dovetail 32 at the back end to fit into the dovetail on the mounting block. The extension arm 31 extends forwardly of this rear mounting member and downwardly for a purpose to be described hereinafter. At the front end the extension arm again extends forwardly and terminates in a slot end 33 in which a tool bit 36 is held by set screws 37. The width of the slot 34 in this end is great enough to accommodate a tool bit of any size, including the largest, used in any machine of this type.

Figures 3, 4, 5:
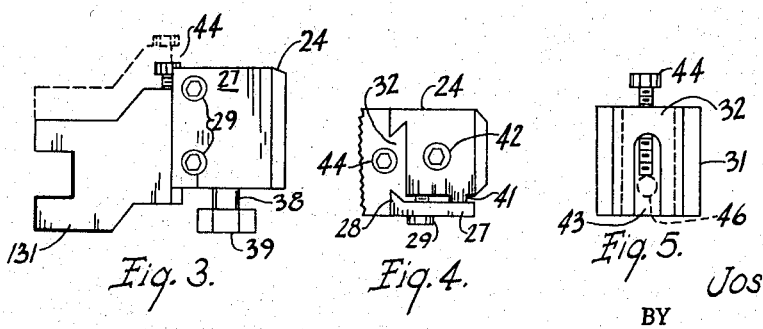
FIG. 3 is a side view of a modified embodiment of the tool holder in FIG. 2.
FIG. 4 is a top view of a section of the extension tool holder of FIG. 3.
FIG. 5 is a view of the rear surface of the extension arm of FIG. 2.

FIG. 3 shows a modified extension tool holder in which the arm 131 is much shorter than that shown in FIG. 2, but otherwise these tool holders are identical. The arm 131 is shown in solid lines at its lowermost position and in broken lines at its highest position relative to the mounting block 24. A stud 38 for mounting the block on the turret 18 extends from the bottom of the block, and in accordance with standard practice, this stud has a head 39 that fits into a mounting slot on the turret.

FIG. 4 is a top view of the extension tool holder of FIG. 3 and shows the arrangement of the side piece 27. The mounting block 24 has a vertical ridge 41 near its back edge and one edge of the side piece 27 rests on this vertical ridge. The side piece is held in place by the screws 29, and as these are tightened, the side pieces, pivots on the ridge 41 so that the lip 28 grips the dovetail section 32 tightly.

FIG. 4 also shows an Allen head screw 42 which connects with the stud 38 shown in FIG. 3 to draw the stud up toward the mounting block and thus to tighten the mounting block upon the turret 18 of FIG. 1.

FIG. 5 shows the back end of the extension arm separate from the mounting block. As may be seen, there is a vertical slot 43 in the center of the male dovetatil section 32. A set screw 44 is threaded into the dovetail section 32 directly in line with the slot 43 so that it may extend down as far as is desired into the slot. The purpose of the set screw 44 is to engage a pin 46 that extends from the surface 26a of the mounting block. This pin is shown in broken lines in FIG. 5 to illustrate its relative position with respect to the slot 43; in actual practice the pin extends from and is part of the mounting block 24 and would not be visible merely looking at the back end of the extension arm 31.

Referring again to FIG. 1, it will be seen that by means of the sliding arrangement between the arm 31 and the mounting block 24, the position of the tool pin 31 may be set precisely with respect to the centerline 47 of the spindle 13 and without any need for shims, which are far more laborious to install. Once the vertical position is set by adjustment of the set screw 44, the side piece 27 can be clamped tightly against the dovetail 32 (see FIG. 2) and machining of the work piece can begin. Not only is it unnecessary to shim up small bits 36, but it is also unnecessary to provide special extension arms 31 having small slots 34 to accommodate the small bits. One size, which is large enough for all bits, is sufficient.

FIG. 6 shows one of the tool holders on the turret 18 and illustrates the way that a long work piece 48 can extend over the turret to permit machining to be carried out some distance from the outer end of the work piece. The maximum diameter of the work piece 48 is limited only by the vertical distance between the centerline 47 and the top of the turret 18. The vertical separation between the centerline and the turret is shown in FIG. 1 and is determined by the design of the chucking machine.

FIG. 7 shows a modified form of tool holder specially suited for gripping round tools, such as boring bits. This tool holder has a slot 134 which is perpendicular to the direction of the slot 34 in the tool holder of FIG. 2. In effect, the arm 231 of FIG. 7 is bent 90° so that the slot 134 is aligned with the axis 47 rather than being perpendicular to it. In addition, the slot 134 has a groove 49 to accommodate a round bit, but in all other respects the extension arm 231 is the same as the extension arm 31 of FIGS. 2 and 5. In normal operation, the extension arm 231 of FIG. 7 would be placed, and the mounting block to which it was attached would be placed, so that the axis of the round boring bit was coincident with the axis 47 of the chucking machine.

While this invention has been described in terms of specific embodiments, it will be recognized by those skilled in the art that modifications may be made therein within the true scope of the invention as determined by the following claim.

What is claimed is:

A tool holder for a chucking machine and the like, said tool holder comprising:
- a mounting block for attachment to one surface of a chucking machine turret;
- an extension arm;
- tool bit gripping means comprising a transverse slot at one end of said arm, the other end of said arm being movably attached to said block to be moved perpendicular to said surface;
- a stop on said block;
- means on said other end of said arm to set said arm with respect to said stop, said one end of said arm being offset with respect to said other end in the direction toward said surface of said turret, said means comprising a second slot extending part-way across said other end of said arm perpendicular to said surface and to said transverse slot, a set screw threaded through said other end of said arm and extending into said second slot in alignment therewith to press against said stop when said arm is slid into place on said mounting block, and matching male and female dove-tail engagement members on said block and said other end of said arm extending parallel to said second slot to guide said arm into position on said block, one side of said female dove-tail member being movable perpendicular to said second slot and being provided with engagement means to grasp said male dove-tail member to hold said arm rigidly in place on said mounting block with said set screw in contact with said stop.

References Cited

UNITED STATES PATENTS

| | | | |
|---|---|---|---|
| 950,329 | 2/1910 | Hillenbrand | 82—37 |
| 1,230,974 | 6/1917 | Abbott | 82—35 X |
| 2,403,405 | 7/1946 | Sirola | 82—36 X |
| 2,616,326 | 10/1952 | Bergstrom | 82—36 |
| 3,213,722 | 10/1965 | Maglica | 82—36 |

FOREIGN PATENTS

| | | |
|---|---|---|
| 608,585 | 1/1935 | Germany. |
| 14,004 | 6/1909 | Great Britain. |

LEONIDAS VLACHOS, *Primary Examiner.*